United States Patent [19]

Spencer et al.

[11] Patent Number: 4,483,530
[45] Date of Patent: Nov. 20, 1984

[54] DOCUMENT PROCESSING SYSTEMS

[75] Inventors: William H. Spencer, Monrovia; Raymond M. McManaman; Roy A. Teves, both of Glendora, all of Calif.

[73] Assignee: Bell & Howell Company, Chicago, Ill.

[21] Appl. No.: 464,540

[22] Filed: Feb. 7, 1983

Related U.S. Application Data

[63] Continuation of Ser. No. 230,145, Jan. 30, 1981, abandoned.

[51] Int. Cl.³ .......................... B65H 9/04; B65H 5/06
[52] U.S. Cl. ..................................... 271/236; 271/251; 271/225; 271/184; 271/265; 271/227; 271/250
[58] Field of Search ............... 271/236, 235, 242, 251, 271/225, 184, 265, 227, 228, 245, 246, 250

[56] References Cited

U.S. PATENT DOCUMENTS

| 3,195,887 | 7/1965 | Bean ................................. 271/227 |
| 3,368,701 | 2/1968 | Copping et al. ................ 271/265 X |
| 3,790,162 | 2/1974 | Halbert ........................... 271/110 X |
| 4,082,263 | 4/1978 | Baumburger et al. .......... 271/265 X |
| 4,150,743 | 4/1979 | Lazzarotti et al. ............. 271/110 X |

FOREIGN PATENT DOCUMENTS 2914969 10/1980 Fed. Rep. of Germany ...... 271/251
1543122  3/1979 United Kingdom .

OTHER PUBLICATIONS

Diel, F. M. et al., "Document Aligner", *IBM Technical Disclosure Bulletin*, vol. 19, No. 9, Feb. 1977, p. 3499.

*Primary Examiner*—Bruce H. Stoner, Jr.
*Assistant Examiner*—James E. Barlow
*Attorney, Agent, or Firm*—Benoit Law Corporation

[57] ABSTRACT

Methods of a human operator processing first and second interrelated documents in pairs relative to a processing station provide a first document entry station for receiving a first document from the human operator, and a second document entry station for receiving a second document from the human operator. The human operator separates the interrelated first and second documents from each other and deposits the first document in the first document entry station while depositing the second document in the second document entry station. The deposited first document is transported from the first document entry station relative to the processing station, and the second document is transferred from the second to the first document entry station, for subsequent transport from such first station relative to the processing station.

6 Claims, 3 Drawing Figures

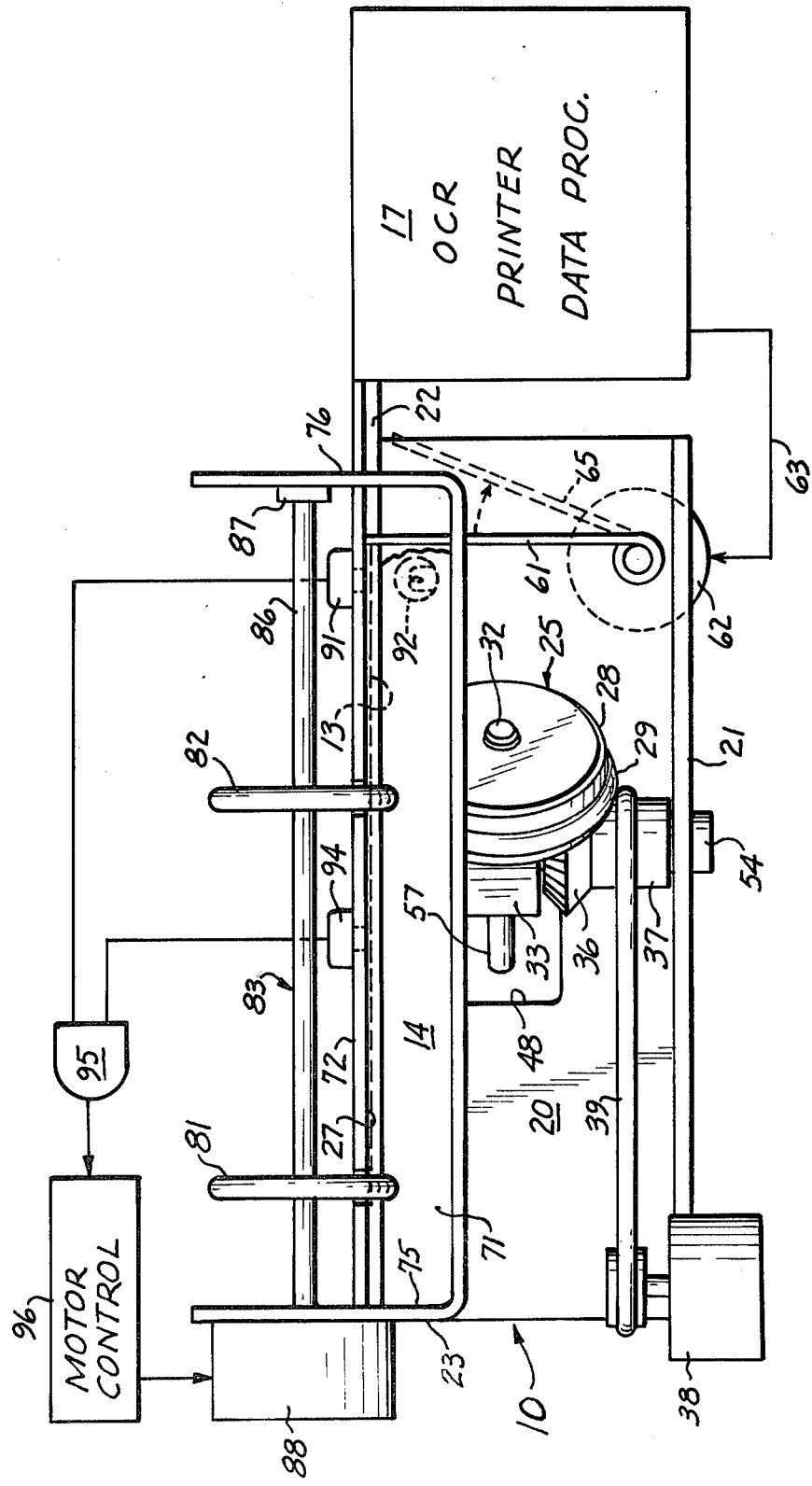

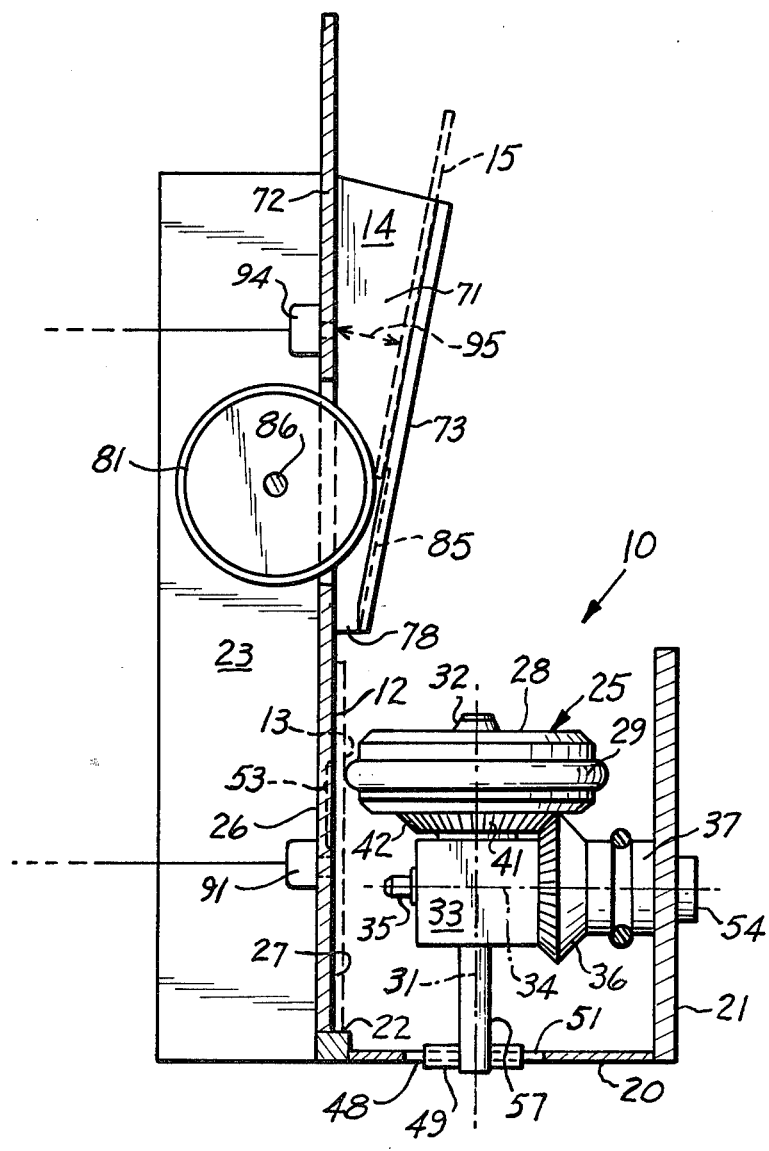

DOCUMENT PROCESSING SYSTEMS

CROSS-REFERENCES

This is a continuation of application Ser. No. 230,145, filed Jan. 30, 1981, for Document Processing Systems, now abandoned.

Angular-linear sheet transports of the type shown and described herein for the illustrated preferred embodiment are disclosed and claimed in U.S. Pat. No. 4,362,298, by Rafn Stefansson et al, issued Dec. 7, 1982 to the common assignee hereof.

BACKGROUND OF THE INVENTION

The subject invention relates to document and data processing and handling systems and, more specifically, to methods and apparatus for processing interrelated papers and documents, and to document or sheet transports.

Over the years, there has been an increasing need for more efficient document processing systems.

By way of example and not by way of limitation, there are many labor-intensive situations where payment checks and returned invoice stubs have to be processed jointly, such as for the purpose of verifying and recording payment by customers of public utilities, financial institutions and other enterprises.

In such instances, the particular institution or business carries a high obligation to make sure that each payment check is properly correlated with the corresponding returned invoice stub, and that each paying customer is properly credited for payment made. In short, utmost care has to be exercised to avoid embarassing and damaging instances of erroneous payment entries and spurious charges of underpayment.

Existing systems still place a large burden on the operator in this respect, in failing to make his or her job convenient and reasonably failure proof to an extend of rendering negligible all probability of error.

SUMMARY OF THE INVENTION

It is a general object of this invention to overcome the disadvantages and to meet the needs expressed or implicit in the above disclosure statement or in other parts hereof.

It is a germane object of this invention to provide improved document processing systems.

It is a related object of this invention to provide improved methods and apparatus for processing interrelated documents.

It is also an object of this invention to provide improved document or sheet transports.

Other objects of the invention will become apparent in the further course of this disclosure.

The subject invention resides in methods of a human operator processing first and second interrelated documents in pairs relative to a processing station. These methods provide a first document entry station for receiving a first document from the human operator and a second document entry station for receiving a second document from the human operator. The human operator separates the interrelated first and second documents from each other and deposits the first document in the first document entry station while depositing the second document in the second document entry station, so as to avoid confusion and error. The first document is then transported from the first document entry station relative to the processing station, and the second document is transferred from the second document entry station to the to the first document entry station, for subsequent transport of the transferred second document from the first document entry station relative to the processing station.

By way of example, such methods and apparatus according to a preferred embodiment of the subject invention enable a human operator to handle interrelated documents, such as a payment check and a corresponding invoice stub, in pairs, in a convenient and efficient manner which practically excludes error and permits the operator to concentrate on the data processing aspects of the transaction.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 2 is a top view of the apparatus of FIG. 1, with associated equipment illustrated in block diagram; and FIG. 3 is a section along the line 3—3 in FIG. 1.

DESCRIPTION OF PREFERRED EMBODIMENTS

Figure 1:
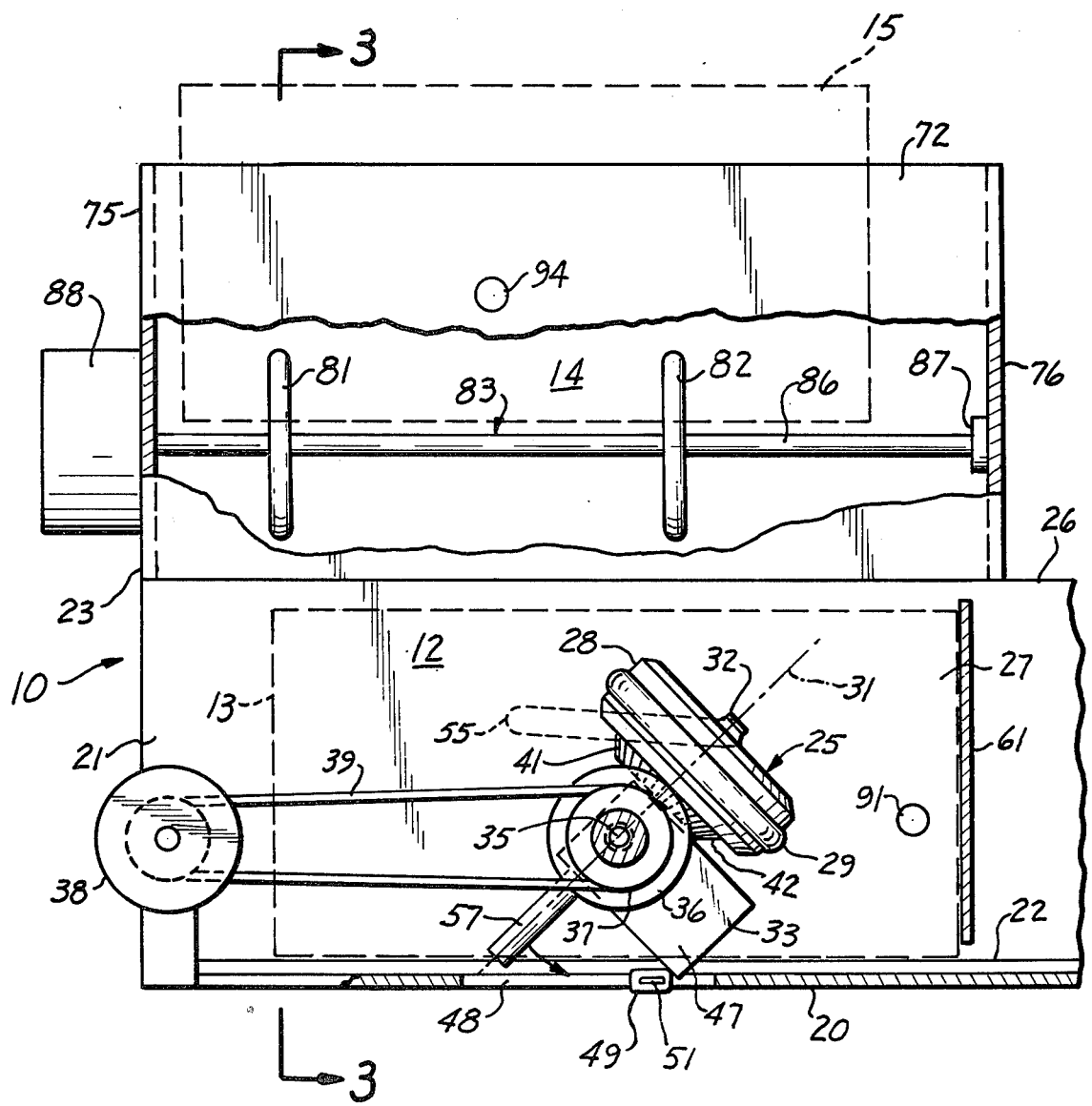
FIG. 1 is an elevation, with front parts removed, of an apparatus for receiving and transporting interrelated documents.

The document processing apparatus 10 shown in the drawings has a first document entry station 12 for receiving a first document, indicated in dotted outline at 13, and a second document entry station 14 adjacent the first entry station 12, for receiving a second document, indicated in FIGS. 1 and 3 in dotted outline at 15.

The documents 13 and 15 are interrelated. By way of example and not by way of limitation, the document 13 may be an invoice stub and the document 15 a check. In particular, the document 13 may be the stub portion of an invoice which has been returned to a public utility or financial institution by a customer together with a check 15 in payment of a utility bill or other obligation.

At the processing center of the particular utility company or financial institution, the human operator would, if necessary, separate the check from the returned invoice stub and would then place the stub 13, for instance, into the first document entry station 12, while positioning the check 15 into the second document entry station or hopper 14. In this manner, the operator may conveniently deposit both the payment documentation 13 and the corresponding payment instrument 15 at the same time, thereby avoiding confusion and error. The apparatus 10 transports the positioned first document 13 from its first location in the first document entry station 12 relative to a processing station 17.

As more fully disclosed below, the apparatus 10 also transfers the positioned second document 15 from its second location in the second document entry station 14 to a first location in the first document entry station 12. In this respect, such first location of the second document 15 may be the same as the above-mentioned first location of the first document 13 in the first entry station 12.

The apparatus 10 thereupon transports the transferred second document 15 from its transferred location in the first entry station 12 relative to the processing station 17.

The apparatus 10 shown in FIGS. 1 to 3 has a baseplate 20 and a mounting plate 21 extending perpendicularly thereto along one edge thereof. A registration edge or bar 22 extends along the other edge of the baseplate 20. The baseplate 20 may be attached to or part of a frame 23. For better visibility of detail, the mounting plate 21 has been deleted from the elevation of FIG. 1.

In principle, a single document drive device 25 may be employed for sheet alignment and transportation purposes in station 12. However, two or more identical or similar document drive devices may in practice be employed for moving a document 13 or 15 in the first entry station first forward and then along the registration edge 22.

As shown by way of example in the drawings, the device 25 may have a document drive wheel 28 including a circumferential friction surface or tire 29 for peripherally engaging any document 13 and 15 for transportation thereof on the support surface 27 of a document support 26.

The first drive wheel 28 is rotatable about an angularly movable first axis 31. To this end, the wheel 28 is rotatably mounted on a shaft 32 which, in turn, is mounted in a block 33. The mounting block 33, in turn is mounted for angular movement about a second axis 34 on a shaft 35.

The second axis 34 extends at an angle to the first axis 31. Preferably, the second axis intersects the first axis at right angles, though other angular arrangements are conceivable. If the axes 31 and 34 are intersecting, the first shaft 32 may then only extend partially into the mounting block 33, with the wheel 28 being made rotatable about the shaft 32.

A second drive wheel is rotatable about the second axis 34 and may be connected to or integral with a pulley 37. Both the second wheel 36 and pulley 37 may be rotatably mounted on the second shaft 35. As seen in FIGS. 1 and 2, the pulley 36 is driven by an electric motor 38 via a transmission and belting 39.

The document drive device 25 also has a third wheel 41 for driving the first wheel.

The third wheel 41 may be in driving engagement with the first wheel 28 and also with the second wheel 36. To this end, the third wheel 41, as seen in FIGS. 1 and 3, may be realized by providing the first wheel 28 laterally with a circular driven part 42 extending about the first axis 31 in a tangential plane of the second wheel 36.

The latter tangential plane may be flat and extend perpendicularly to the first axis 31, if the second wheel 36 were an externally-toothed pinion, and the third wheel 41 were a crown wheel engaging such second wheel at an outer periphery thereof. On the other hand, in the case of meshing bevel gears at 36 and 41 as shown in FIGS. 1 and 3, the mentioned tangential plane may extend at an angle to the axis 31 and may even be curved, as in the form of a cone about the first axis 31 or a cone about the second axis 34.

For the purpose of better visibility of various parts, FIG. 3 shows the first drive wheel in an erected position. However, it should be understood that the first drive wheel 28 is initially positioned at an angle to the registration edge 22. Reference may in this respect be had to FIG. 1 for an illustration of an appropriate initial angular position of the first drive wheel 28.

In principle, a bias spring could be employed for biasing the first drive wheel 28 to its initial angular position shown in FIG. 1. In operation, the first drive wheel 28 would then erect itself toward the position shown in FIG. 3 against the bias of such spring (not shown). In practice, this typically would require the drive wheel 28 to overcome a progressively increasing spring bias force as it climbs along the inserted document 13 or 15 to its erected position.

This may be avoided by employing a mass or weight 47 for urging the first wheel 28 to its initial slanted position. As seen in FIG. 1, the weight 47 may form part of or constitute the mounting block 33. The baseplate 12 is advantageously provided with an aperture 48 having a stop 49 therein.

The stop 49 may be formed by an elongate tooth 51 projecting into the aperture 48 and having, for instance, an elastomeric sleeve located thereon.

As seen in FIG. 1, the weight 47 enters with one of its corners the aperture 48, and abuts against the stop 49, thereby removably retaining the first drive wheel 28 in its initial inclined position.

In such initial or angular position, the first wheel 28 is rotated with the second wheel 36 through the third wheel 41 or lateral driven part 42. In practice, it is preferable that the motor 38 drive the wheels continuously while the apparatus is in operation and is waiting for an insertion of sheets or cards. This, however, presupposes that the rim 29 of the drive wheel not contact the sheet support surface 27 at the time, since such a contact could cause the drive wheel 28 to climb up on the surface 27 to its erected position before a sheet were inserted.

In this respect, a round insert mounted in a hole in the support plate 26 as shown, for instance, at 108 in FIGS. 6 and 7 of U.S. Pat. No. 2,767,982, issued Oct. 23, 1956, to A. W. Noon, and herewith incorporated by reference herein, may be employed.

Alternatively, a groove 53 may be provided in the plate 26 at the sheet supporting surface 27. A side view of groove 53 is indicated in dotted outline in FIG. 3. The cavity or groove 53 may be curved, such as in the manner of the curved trajectory of the angularly moving or climbing wheel 28, so that the drive wheel will return automatically from an advanced to its inclined initial position. Each document or sheet 13 and 15 bridges the gap 53 as it enters the station 12 and is thus brought into peripheral engagement with the first drive wheel 28 or its rim 29. This, in turn, causes the inclined drive wheel 28 to transport the document 13 or 15 on the support surface 27 to the registration edge 22.

The third wheel 41 with the first wheel 28 is thereupon swiveled about the second axis 34, and about the second wheel 36, toward parallel relationship with the registration edge, as seen in FIG. 3. In this respect, and with reference to illustrated preferred embodiment of the invention, the angular movement of the wheel axis 31 from its initial inclined position is due to an imbalance of forces acting on the wheel 28 from the drive gear 36/42 and a reaction force exerted on the wheel 28 via its peripheral rim 29 by the positioned document abutting the reference edge 22. The relative location and direction of forces thus involved is a function of the geometry of the system, with the geometry illustrated in the drawings conforming to what is currently considered the best solution.

The drive assembly including shaft 35 may be mounted on the plate 21 with a bearing 54 for rotation relative thereto.

FIG. 3 shows how the sheet drive wheel may swivel or swing into parallel relationship to the registration edge 22, to transport the positioned document 13 or 15 along the registration edge 22. While the achievement of such parallel relationship is within the broad scope of the disclosed embodiment, it is not absolutely necessary, and in some instances not even necessarily desirable, that the drive wheel 28 be swung into exact parallel relationship to the registration edge 22. Rather, the stop 49 may be so positioned that it will prevent the sheet drive wheel 28 from reaching a complete upright position. In other words, the rotating wheel is swung toward parallel relationship with the registration edge 22, whether such wheel does or does not reach an exactly upright position or parallel relationship with the edge 22. A possible upright position of the drive rim 29 is thus indicated in FIG. 1 in dotted outline at 55.

In the embodiment shown in the drawings, the circular driven part 42 or third wheel 41 may be laterally moved with the first wheel 28 relative to the second wheel 36 equidistantly about the second axis 34 to swing the first wheel toward parallel relationship with the registration edge 22. The mounting block 33 may be equipped with a projection or shaft 57 extending along part of the first axis of rotation 31 of the document drive wheel 26.

In either case, the swiveling motion of the wheel 28 is stopped as the projection 57 abuts against the stop 49.

The swiveled or swung first wheel 28 is further rotated with the second wheel 36 through the third wheel 41 or driven part 42 about the first axis 31 to transport the document along the registration edge 22. If the wheel 28, by appropriate positioning of the stop elements 49 and 57 or otherwise, is prevented from reaching a fully upright position in parallel relationship to the edge 22, then the swiveled wheel will continue to exert a force component on the positioned document not only in a direction parallel to the edge 22, but also at an angle to such edge. In this manner, the registering document will experience a continued loading against the registration edge for a precise positioning relative to printing and electrooptical reading or other equipment 17.

The illustrated apparatus permits an aligned document to be temporarily retained at the drive wheels 28. For instance, FIGS. 1 and 2 show an electromechanical gate 61 for temporarily retaining each document 13 and 15 in the entry station 12. In its closed position shown in solid outline in FIGS. 1 and 2, the gate 61 retains an aligned document in registration with the edge 22 until the processing equipment 17 is ready to receive that document.

As soon as the equipment to which the aligned document is to be fed is ready, an actuator 62 may be energized thereby, via a line 63, to open the gate 61 as shown in dotted outline at 65 in FIG. 2. This enables the drive wheel 28 to advance the aligned document further along the registration edge 22 and into any conveyor belt system or other component of the processing station 17.

Upon departure of the aligned document 13 from the station 12, the drive wheel 28 returns automatically to its inclined initial position, shown in FIG. 1, ready to receive and align the next document, such as the document 15 transferred from the second to the first entry station.

In this respect, the second document entry station 14 and thus the above-mentioned second location at which at least the second document 15 is initially positioned, are preferably located above the first document entry station 12 and thus above the above-mentioned first predetermined location of the first document 13, as seen in FIGS. 1 to 3.

The second document entry station 14 has a pocket or hopper 71 composed of a backplate 72 and a document guide or support plate 73. The backplate 72 may be connected to or be part of the apparatus frame 23. The slanted front plate 73 may be connected to the apparatus frame 23 by lateral sides or flanges 75 and 76.

The backplate 72 and front plate 73 form a pocket which tapers toward a relatively narrow lower exit opening 78 in the vicinity of the first document entry station 12. Fourth and fifth document drive wheels 81 and 82 of a second document driving device 83 project through apertures in the backplate 72 into the tapered pocket 71 and into close proximity to the front guide 73.

The projecting document drive wheels 81 and 82 thus releasably retain in their stationary position an inserted document 15 at the second document entry station 14. If desired, grooves indicated in dotted outline at 85 in FIG. 3 may be provided adjacent the wheels 81 and 82 in the front plate 73, so as to permit the wheels 81 and 82 to be positioned sufficiently close to the front plate 73 to provide for releasable retention of even thin documents or sheets at the entry station 14.

The document drive wheels 81 and 82 are mounted on a shaft 86 which, in turn, has a first end rotatably mounted in a bearing 87 on the side flange 76, and a second end connected to an electric drive motor 88 for rotation thereby.

The illustrated preferred embodiment senses a departure of the positioned first document 13 from the first location or document entry station 12. As indicated in the drawings, a first photocell or similar document-sensing device 91 may be provided for this purpose. By way of example, the photocell 91 may be exposed to light through the backplate 26 when no document is located in the first entry station 12.

A light source 92 may be provided for this purpose, as indicated in FIG. 2.

A second document-sensing device for photocell 94 operates through the backplate 72 in order to sense the presence of a document in the second entry station 14. As indicated at 95 in FIG. 3, a photocell assembly which emits light into the pocket 71 may be employed at 94. In that case, the area of the front plate 73 facing the photocell assembly 94 is preferably darkened to prevent a reflection of light therefrom. On the other hand, an inserted document will reflect light to the photocell assembly 94, thereby causing same to produce a document-sensing signal. The same principle may, if desired, be employed at 91.

However, in the illustrated preferred embodiment, the photocell assembly 91 is designed to emit a signal to a first input of an AND element 95 whenever there is no document in the first entry station 12. Conversely, the reflective photocell assembly 94 emits a signal to the second input of the AND element 95 whenever there is a document in the second entry station 14.

The concurrent output signals of the photocell assemblies 91 and 94 cause the AND element 95 to switch on the motor control 96 which, in turn, then energizes the motor 88 for rotation of the drive wheel assembly 83 in clockwise direction, as seen in FIG. 3. In principle, the motor control 96 may comprise a relay which is energized by the output signal of the AND element 95 and which then closes an energization switch for the motor 88.

As indicated above, the photocell assembly 91 thus senses a departure of the positioned first document 13 from the first location or document entry station 12, and the second document drive assembly 83, with associated components 88 and 94 to 96, then transfers the positioned second document 15 from the second location or document entry station 14 to the first location or document entry station 12 upon sensing of the first document departure by the photocell assembly 91.

The second document 15 is thus inserted from the upper pocket 71 into the lower document entry station 12, where it is received by the first document drive wheel 28, to be aligned on the registration edge 22 and positioned against the closed gate 61 by action of the first document driving device 25, in the manner described above with reference to the previously positioned first document 13.

The second photocell assembly 94 ceases to supply the AND element 95 with a signal upon departure of the second document 15 from the upper entry station 14. Accordingly, the motor 88 is caused to stop rotation of the drive assembly 83 when the particular document has been transferred to the lower entry station 12. A certain time delay may be provided in the motor control 96, to assure that the document 15 has been inserted into the lower station by the wheels 81 and 82, before rotation of such wheels is caused to stop.

The transferred aligning second document 15 will promptly obscure the lower photocell assembly 91 in the first entry station 12, whereby emission of a signal by the photocell assembly 91 to the AND element 95 will stop. Accordingly, a further inserted document in the upper entry station 14 will be retained therein by the then stopped wheels 81 and 82, until the then present document in the lower entry station 12 has cleared the photocell assembly 91 on its way to the processing station 17. It may be noted in this connection that what has so far been called the "first document entry station 12" need not necessarily be the first station in time or sequence into which first document 13 is inserted. Rather, if more convenient to the operator, the first document 13 may first be inserted into the upper second entry station 14, at the time when no other document is present in either station. In that case, the lower photocell assembly 91 will be unobstructed and will thus provide the AND element 95 with an input signal. Also, the upper photocell assembly 94 will provide the AND element 95 with an input signal upon sensing the entered first document 13 in the upper bin 14.

Accordingly, the AND element 95 and motor control 96 start the motor 88 which, thereupon, rotates the drive assembly 83, causing transfer of the inserted first document 13 from the upper document entry station 14.

The transferred first document is then processed in the manner described above, being aligned and transported by the first drive 25. Also, the second document 15 may be inserted into the upper entry station 14 as soon as the first document 13 has been positioned in the first or lower entry station 12 against the gate 61, thereby obscuring the lower photocell assembly 91.

In consequence, the then stopped wheels 81 and 82 will retain the second document 15 in the upper entry station 14, as shown in FIG. 3, pending clearance of the lower entry station 12 by the departing first document 13, whereupon the document drive 83 will be reactivated as described above, transferring the positioned second document from the upper to the lower document entry station.

Accordingly, the positioning of the first document 13 according to an embodiment of the subject invention includes the steps of positioning such first document 13 initially at the second predetermined location or document entry station 14, transferring such first document 13 from that second location or entry station 14 to the first location or entry station 12, and positioning such transferred first document 13 at the first location or entry station 12, such as by means of the document drive device 24.

It is thus seen that the means 83, 88, etc. at the second entry station 14 also include or act as means for transferring any first document 13, as well as any second document 15, positioned in the second entry station 14 from such second entry station to the first entry station 12.

Accordingly, a preferred embodiment of the subject invention provides means at the second entry station 14 for releasably retaining a document 13 or 15 at such second entry station. For instance, a document driving device or assembly 83 may be provided for releasably retaining in a stationary condition a document 13 or 15 at the second entry station 14, and for selectively transferring such releaseably retained document to the first entry station 12, essentially as described above.

The processing station 17 into which the first and second documents 13 and 15 are moved seriatim may be of a conventional type including, for instance, optical character reading (OCR), printing and data processing facilities. For instance, in the case of remittance processing systems, the station 17 may include facilities for printing coded indicia on documents and instruments, representing a remitted amount, reading such printed indicia, and processing customer information and other data.

The subject invention and its preferred embodiments overcome the initially stated problems and meet the above mentioned needs and objectives, providing improved document processing systems, methods and apparatus for handling interrelated documents, and entry stations for remittance processing systems.

The subject extensive disclosure will render apparent or suggest to those skilled in the art various modifications and variations within the spirit and scope of the disclosed invention and equivalents thereof.

We claim:

1. In a method of a human operator processing first and second interrelated documents in pairs relative to a processing station, the improvement comprising in combination the steps of:

providing a first document entry station for receiving a first document from said human operator;

providing a second document entry station for receiving a second document from said human operator;

said human operator separating said interrelated first and second documents from each other;

said human operator depositing said first document in said first document entry station while depositing said second document in said second document entry station so as to avoid confusion and error;

transporting said first document from said first document entry station relative to said processing station;

transferring said second document from said second document entry station to said first document entry station; and transporting said transferred second document from said first document entry station relative to said processing station.

2. A method as claimed in claim 1, including the step of:

arranging said second location above said first location.

3. A method as claimed in claim 2, including the steps of:

sensing a departure of said deposited first document from said first document entry station and concurrently sensing the presence of a second document in said second document entry station; and transferring said second document from said second to said first document entry station upon sensing of said departure and concurrent sensing of said presence.

4. A method as claimed in claim 1, including the steps of:

sensing a departure of said deposited first document from said first document entry station and concurrently sensing the presence of a second document in said second document entry station; and transferring said second document from said second to said first document entry station upon sensing of said departure and concurrent sensing of said presence.

5. In a method of a human operator processing first and second interrelated documents in pairs relative to a processing station, the improvement comprising in combination the steps of:

providing a first document entry station;

providing a second document entry station;

said human operator separating said interrelated first and second documents from each other;

said human operator depositing the first document initially in said second document entry station;

transferring the first document from said second to said first document entry station, and positioning said transferred first document in said first document entry station;

said human operator depositing said second document in said second document entry station after the first document has been positioned in the first entry station;

transporting said first document from said first document entry station relative to said processing station;

transferring said second document from said second document entry station to said first document entry station; and transporting said transferred second document from said first document entry station relative to said processing station.

6. A method as claimed in claim 3, including the steps of:

sensing a departure of said deposited first document from said first document entry station and concurrently sensing the presence of a second document in said second document entry station; and transferring said second document from said second to said first document entry station upon sensing of said departure and concurrent sensing of said presence.

* * * * *